US007339978B2

(12) United States Patent
Zhang (10) Patent No.: US 7,339,978 B2
(45) Date of Patent: *Mar. 4, 2008

(54) ADAPTIVE WEIGHT UPDATE METHOD AND SYSTEM FOR A DISCRETE MULTITONE SPREAD SPECTRUM COMMUNICATIONS SYSTEM

(75) Inventor: Hongliang Zhang, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/222,554

(22) Filed: Sep. 9, 2005

(65) Prior Publication Data

US 2006/0062281 A1  Mar. 23, 2006

Related U.S. Application Data

(63) Continuation of application No. 09/999,048, filed on Nov. 15, 2001, now Pat. No. 6,975,668, which is a continuation of application No. 09/699,361, filed on Oct. 31, 2000, now Pat. No. 6,408,016, which is a continuation of application No. 09/299,079, filed on Apr. 26, 1999, now Pat. No. 6,160,839, which is a continuation of application No. 08/804,616, filed on Feb. 24, 1997, now Pat. No. 5,923,700.

(51) Int. Cl.
*H04B 1/707* (2006.01)
*H04B 15/00* (2006.01)
*H04B 1/38* (2006.01)
*H04K 1/00* (2006.01)

(52) U.S. Cl. ............... 375/140; 375/130; 375/219; 370/342; 370/479

(58) Field of Classification Search ............... 375/130, 375/132, 133, 138, 140, 141, 147, 148, 211, 375/219, 222, 224, 232, 260, 347, 259, 295; 370/203, 208, 252, 280, 294, 320, 335, 342, 370/441, 479; 714/704, 708; 708/322, 323; 455/132, 133, 135, 136, 67.3, 272, 422.1, 455/424, 561, 73
See application file for complete search history.

(56) References Cited

U.S. PATENT DOCUMENTS 5,764,685 A * 6/1998 Tanaka et al. ............... 375/130
5,781,542 A * 7/1998 Tanaka et al. ............... 370/342
5,923,700 A * 7/1999 Zhang ........................ 375/141

(Continued)

Primary Examiner—Betsy L. Deppe
(74) Attorney, Agent, or Firm—Coulter Henry; Parks Knowlton LLC; Paul Knowlton, Esq.

(57) ABSTRACT

A new method makes the most efficient use of the scarce spectral bandwidth in a wireless discrete multitone spread spectrum communications system by updating the spectral and/or spatial spreading weights at a rate that is determined by the measured quality of the link. Low quality links require more frequent updates of the spreading weights than do higher quality links. Spreading weights and despreading weights for a station are adaptively updated, depending on the error in received signals. If the error value is less than a threshold error value, then the method maintains the existing spreading weights as the current spreading weights to apply to an outgoing data signal. Alternately, if the error value is greater than the threshold error value, then the method adaptively calculates updated despreading weights at the base station from the first spread signal and calculates updated spreading weights as the current spreading weights from the updated despreading weights to apply to the outgoing data signal.

13 Claims, 6 Drawing Sheets

U.S. PATENT DOCUMENTS 6,160,839 A * 12/2000 Zhang ........................ 375/130
6,408,016 B1 * 6/2002 Zhang ........................ 375/130
6,519,278 B1 * 2/2003 Hiramatsu .................. 375/140
6,975,668 B2 * 12/2005 Zhang ........................ 375/140

* cited by examiner

FIG. 5

ADAPTIVE WEIGHT UPDATE METHOD AND SYSTEM FOR A DISCRETE MULTITONE SPREAD SPECTRUM COMMUNICATIONS SYSTEM

CROSS-REFERENCES TO RELATED APPLICATIONS

This application is a continuation of U.S. patent application Ser. No. 09/999,048, filed Nov. 15, 2001, now U.S. Pat. No. 6,975,668, issued Dec. 13, 2005, which is a continuation of U.S. patent application Ser. No. 09/699,361, filed Oct. 31, 2000, now U.S. Pat. No. 6,408,016, issued Jun. 18, 2002, which is a continuation of U.S. Pat. No. 09/299,079, filed Apr. 26, 1999, now U.S. Pat. No. 6,160,839 issued Dec. 12, 2000, which is a continuation of U.S. patent application Ser. No. 08/804,616, filed Feb. 24, 1997, now U.S. Pat. No. 5,923,700 issued Jul. 13, 1999.

The invention disclosed herein is related to co-pending U.S. patent application by S Alamouti, D. Stolarz, and J. Becker, entitled "Vertical Adaptive Antenna Array For Discrete Multitone Spread Spectrum Communications System", Ser. No. 09/128,738 filed Aug. 5, 1998, now U.S. Pat. No. 6,600,776, issued on Jul. 29, 2003, which is a continuation of U.S. patent application Ser. No. 08/937,654 filed Sep. 24, 1997, now abandoned, which is a continuation of U.S. patent application Ser. No. 08/806,510, filed Feb. 24, 1997, now abandoned, all assigned to AT&T Wireless Services, and incorporated herein by reference.

The invention disclosed herein is related to the U.S. patent application by S Alamouti, D. Michaelson, E. Casas, E. Hoole, G. Veintimilla, H. Zhang, M Hirano, P. Pon, and M. Jesse, entitled "Method for Frequency Division Duplex Communications", Ser. No. 08/796,584, filed Feb. 6, 1997, now U.S. Pat. No. 5,933,421 issued Aug. 3, 1999, assigned to AT&T Wireless Services, and incorporated herein by reference.

BACKGROUND OF THE INVENTION

1. Field of the Invention

This invention involves improvements to communications systems and methods in a wireless discrete multitone spread spectrum communications system.

2. Description of Related Art

Wireless communications systems, such as cellular and personal communications systems, operate over limited spectral bandwidths. They must make highly efficient use of the scarce bandwidth resource to provide good service to a large population of users. Code Division Multiple Access (CDMA) protocol has been used by wireless communications systems to efficiently make use of limited bandwidths. The protocol uses a unique code to distinguish each user's data signal from other users' data signals. Knowledge of the unique code with which any specific information is transmitted, permits the separation and construction of each user's message at the receiving end of the communication channel.

Adaptive beamforming technology has become a promising technology for wireless service providers to offer large coverage, high capacity, and high quality service. Based on this technology, a wireless communication system can improve its coverage capability, system capacity, and performance significantly. The personal wireless access network (PWAN) system described in the referenced Alamouti et al. patent application, uses adaptive beamforming combined with a form of the CDMA protocol known as discrete multitone spread spectrum (DMT-SS) to provide efficient communications between a base station and a plurality of remote units. The computation of spectral and/or spatial spreading weights in the PWAN system is intensive. Low quality links require frequent updates of the spreading weights, whereas higher quality links do not. What is needed is a way-to update the spreading weights of links at a rate that is determined by the measured quality of the link.

SUMMARY OF THE INVENTION

The invention disclosed herein is a new method to make the most efficient use of the scarce spectral bandwidth in a wireless discrete multitone spread spectrum communications system. The spectral and/or spatial spreading weights are updated at a rate that is determined by the measured quality of the link. Low quality links require more frequent updates of the spreading weights than do higher quality links.

In accordance with the invention, the method includes the step of receiving at a base station a first spread signal comprising an incoming data signal spread over a plurality of discrete frequencies. The method continues by adaptively despreading the signal received at the base station by using first despreading weights. Then an error value for the first spread signal is computed. The error value is then compared with a threshold error value. Then, in accordance with the invention, the spreading weights and despreading weights for the base station are adaptively updated, depending on the error value. If the error value is less than the threshold error value, then the method maintains the first spreading weights as the current spreading weights at the base station to apply to an outgoing data signal. Alternately, if the error value is greater than the threshold error value, then the method adaptively calculates second despreading weights at the base station from the first spread signal and calculates second spreading weights as the current spreading weights from the second despreading weights to apply to the outgoing data signal. Then method then continues by spreading the outgoing data signal at the base station with the current spreading weights, to distribute the outgoing data signal over a plurality of discrete tones, forming a second spread signal. The method concludes by transmitting the second spread signal. In this manner, the computationally intensive calculation of new spreading and despreading weights is performed only when needed to maintain the desired signal quality.

In accordance with an alternate and preferred embodiment of the invention, the method includes the step of receiving at a base station a new incoming spread signal comprising an incoming data signal spread over a plurality of discrete frequencies. The method continues by accessing a stored error value for a previously received spread signal. The error value is then compared with a threshold error value. Then, in accordance with the invention, the spreading weights and despreading weights for the base station are adaptively updated, depending on the error value. If the error value is less than the threshold error value, then the method maintains the existing despreading and spreading weights as the current spreading weights at the base station to apply to the new incoming signal and the next outgoing data signal. Alternately, if the error value is greater than the threshold error value, then the method adaptively calculates new despreading weights at the base station from the new incoming spread signal and calculates new spreading weights from the new despreading weights to apply to the new incoming signal and the next outgoing data signal. The new incoming signal is then despread using the newest despreading weights. Then the method computes and stores a new error value for the new incoming signal. Later, the next outgoing data signal is spread using the newest spreading weights. The outgoing signal is spread to distribute the outgoing data signal over a plurality of discrete tones. In this manner, the computationally intensive calculation of new spreading and despreading weights is performed only when needed to maintain the desired signal quality.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

DESCRIPTION OF THE PREFERRED EMBODIMENT

Figure 1:
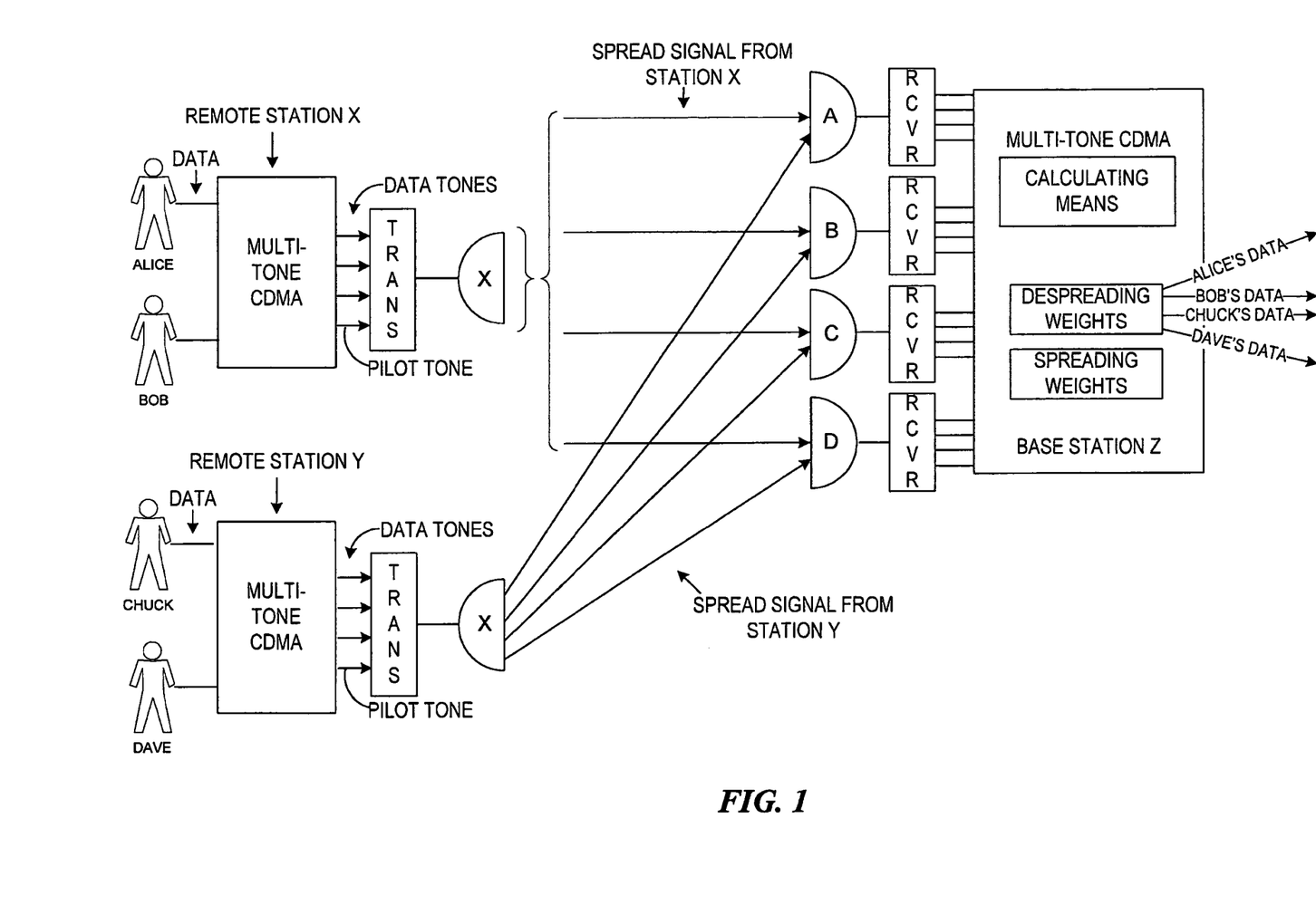
FIG. 1 an architectural diagram of the PWAN system, including remote stations transmitting to a base station.

FIG. 1 an architectural diagram of the personal wireless access network (PWAN) system described in the referenced Alamouti, et al. patent application. Two users, Alice and Bob, are located at the remote station X and wish to transmit their respective data messages to the base station Z. Station X is positioned to be equidistant from the antenna elements A, B, C, and D of the base station Z. Two other users, Chuck and Dave, are located at the remote station Y and also wish to transmit their respective data messages to the base station Z. Station Y is geographically remote from Station X and is not equidistant from the antenna elements A, B, C, and D of the base station Z. The remote stations X and Y and the base station Z use the form of the CDMA protocol known as discrete multitone spread spectrum (DMT-SS) to provide efficient communications between the base station and the plurality of remote station units. This protocol is designated in FIG. 1 as multi-tone CDMA. In this protocol, the user's data signal is modulated by a set of weighted discrete frequencies or tones. The weights are spreading weights that distribute the data signal over many discrete tones covering a broad range of frequencies. The weights are complex numbers with the real component acting to modulate the amplitude of a tone while the complex component of the weight acts to modulate the phase of the same tone. Each tone in the weighted tone set bears the same data signal. Plural users at the transmitting station can use the same tone set to transmit their data, but each of the users sharing the tone set has a different set of spreading weights. The weighted tone set for a particular user is transmitted to the receiving station where it is processed with despreading weights related to the user's spreading weights, to recover the user's data signal. For each of the spatially separated antennas at the receiver, the received multitone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular multitone set and transmitting location. The PWAN system has a total of 2560 discrete tones (carriers) equally spaced in 8 MHz of available bandwidth in the range of 1850 to 1990 MHz. The spacing between the tones is 3.125 kHz. The total set of tones are numbered consecutively form 0 to 2559 starting from the lowest frequency tone. The tones are used to carry traffic messages and overhead messages between the base station and the plurality of remote units. The traffic tones are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Time Division Duplexing (TDD) is used by the base station and the remote unit to transmit data and control information in both directions over the same multitone frequency channel. Transmission from the base station to the remote unit is called forward transmission and transmission from the remote unit to the base station is called reverse transmission. The time between recurrent transmissions from either the remote unit or the base station is the TDD period. In every TDD period, there are four consecutive transmission bursts in each direction. Data is transmitted in each burst using multiple tones. The base station and each remote unit must synchronize and conform to the TDD timing structure and both the base station and the remote unit must synchronize to a framing structure. All remote units and base stations must be synchronized so that all remote units transmit at the same time and then all base stations transmit at the same time. When a remote unit initially powers up, it acquires synchronization from the base station so that it can exchange control and traffic messages within the prescribed TDD time format. The remote unit must also acquire frequency and phase synchronization for the DMT-SS signals so that the remote is operating at the same frequency and phase as the base station.

Selected tones within each tone set are designated as pilots distributed throughout the frequency band. Pilot tones carry known data patterns that enable an accurate channel estimation. The series of pilot tones, having known amplitudes and phases, have a known level and are spaced apart by approximately 30 KHz to provide an accurate representation of the channel response (i.e., the amplitude and phase distortion introduced by the communication channel characteristics) over the entire transmission band.

Figure 2:
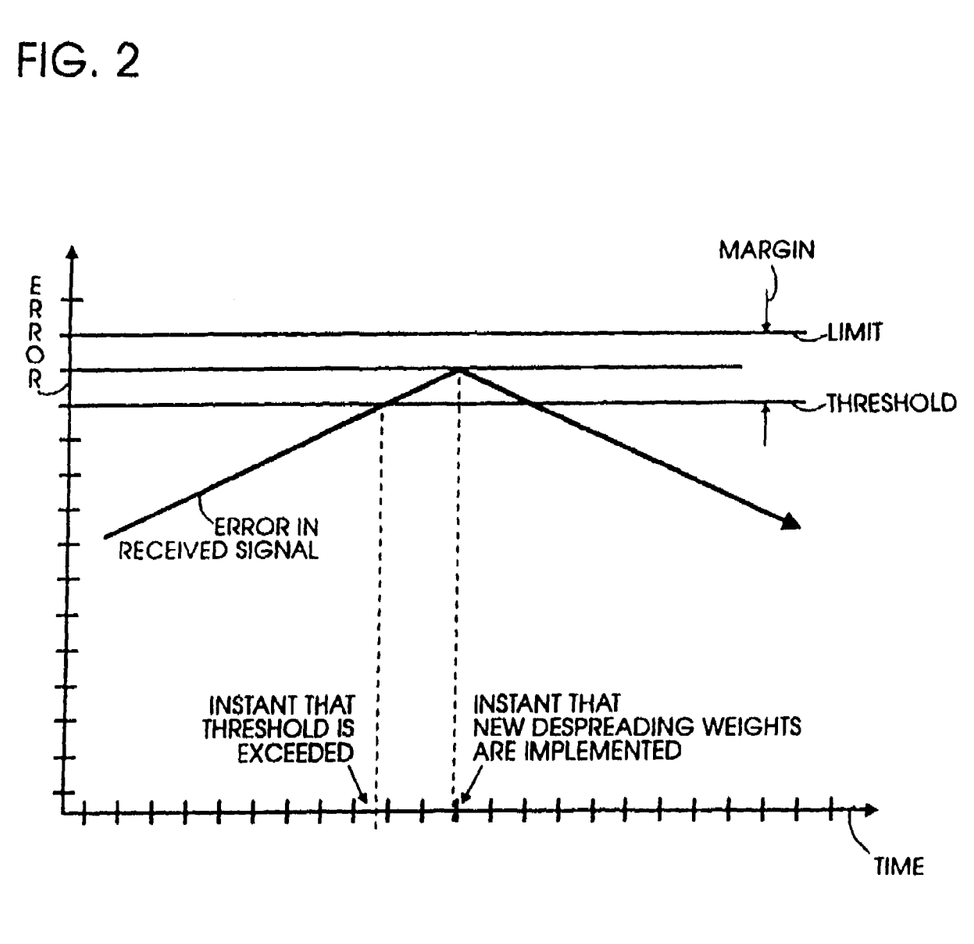
FIG. 2 is a graph illustrating an example change in the received signal quality with respect to time, at the base station.

In accordance with the invention, the spectral and/or spatial spreading weights are updated at a rate that is determined by the measured quality of the link. Low quality links require more frequent updates of the spreading weights than do higher quality links. FIG. 2 illustrates the operation of the invention. As the remote station X, for example, transmits to the base station Z, the error level in the received signal at the base station changes with time. The error level can be determined by evaluating the bit error rate of the received signal using cyclic redundancy codes, for example. Alternately, the error value can be derived from well known Reed-Solomon or trellis encoding techniques. Alternately, a mean square error value can be calculated by comparing the received signal with a reference signal. A limit error value can be specified as the maximum error to be tolerated in the received signal. As FIG. 2 shows, the error in the received signal can increase at a certain rate. To avoid exceeding the limit error value, a margin value is subtracted from the limit error value to obtain the threshold value. When the threshold value is reached by the received signal error, the computation of new despreading weights begins at the base station. The magnitude of the margin value is selected so that the computation can be completed before the limit error value is reached.

Figure 3:
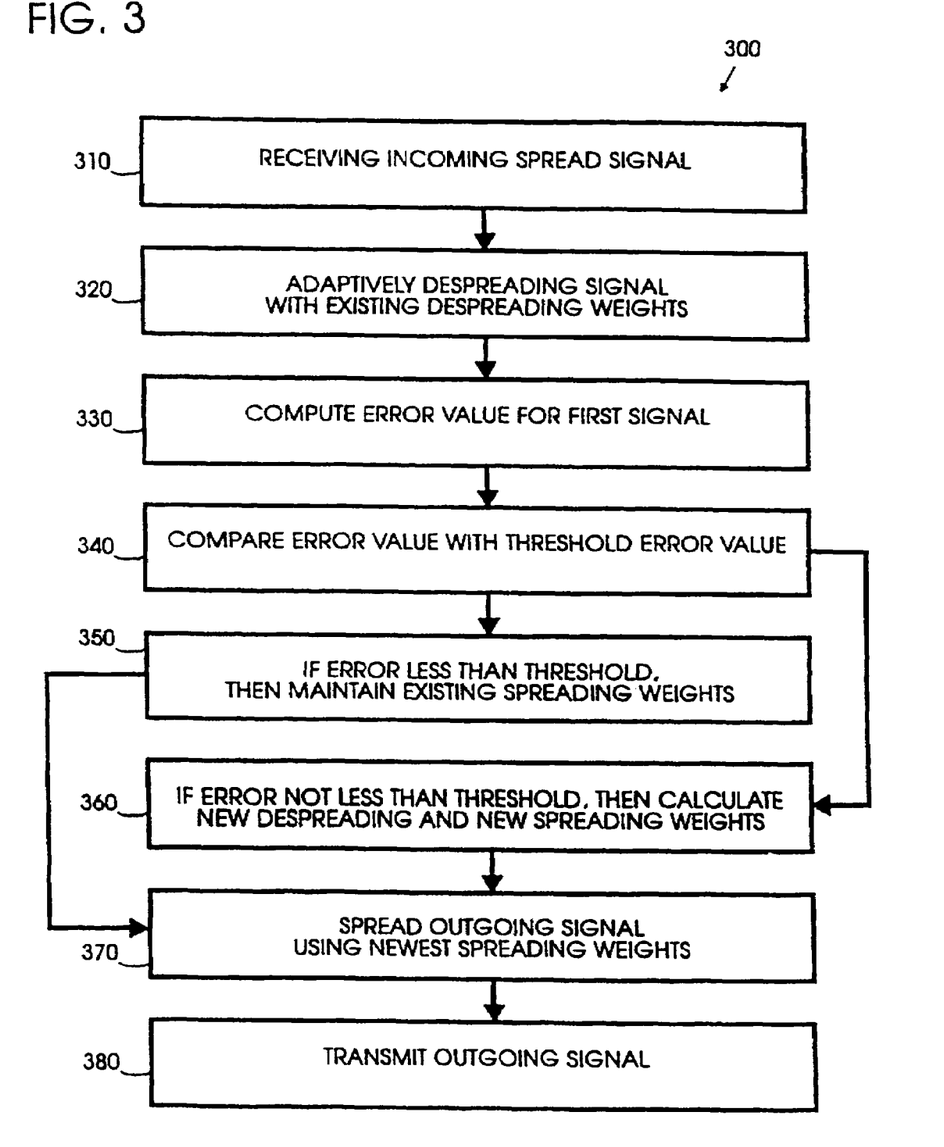
FIG. 3 is a flow diagram illustrating one embodiment of the invention where the despreading and spreading weights at the base station are updated only when the error in the new incoming signal is greater than a threshold value. The new incoming signal is despread with the existing despreading weights followed by the comparison of the error value for the new incoming signal and the selective updating of the weights based on the new incoming signal.

FIG. 3 is a flow diagram 300 illustrating one embodiment of the invention where the despreading and spreading weights at the base station are updated only when the error in the new incoming signal is greater than a threshold value. The new incoming signal is despread with the existing despreading weights followed by the comparison of the error value for the new incoming signal and the selective updating of the weights based on the new incoming signal.

In accordance with the invention, the method includes the step 310 of receiving at a base station a first spread signal comprising an incoming data signal spread over a plurality of discrete frequencies. The method continues with step 320 of adaptively despreading the signal received at the base station by using first despreading weights.

Then in step 330 an error value for the first spread signal is computed.

In step 340 the error value is then compared with a threshold error value.

Then, in accordance with the invention, the spreading weights and despreading weights for the base station are adaptively updated, depending on the error value. In step 350, if the error value is less than the threshold error value, then the method maintains the first spreading weights as the current spreading weights at the base station to apply to an outgoing data signal in step 370.

Alternately, in step 360, if the error value is greater than the threshold error value, then the method adaptively calculates second despreading weights at the base station from the first spread signal and calculates second spreading weights as the current spreading weights from the second despreading weights to apply to the outgoing data signal in step 370.

Then in step 370 the method then continues by spreading the outgoing data signal at the base station with the current spreading weights, to distribute the outgoing data signal over a plurality of discrete tones, forming a second spread signal.

In step 380, the method concludes by transmitting the second spread signal. In this manner, the computationally intensive calculation of new spreading and despreading weights is performed only when needed to maintain the desired signal quality.

In an alternate embodiment of the invention, the method can adaptively equalize the channel response characteristic of the incoming signal at the base station by adaptively updating the despreading weights when the error value is greater than or equal to the threshold error value. The details of this computation are given in the referenced Alamouti, et al. patent application.

Figure 4:
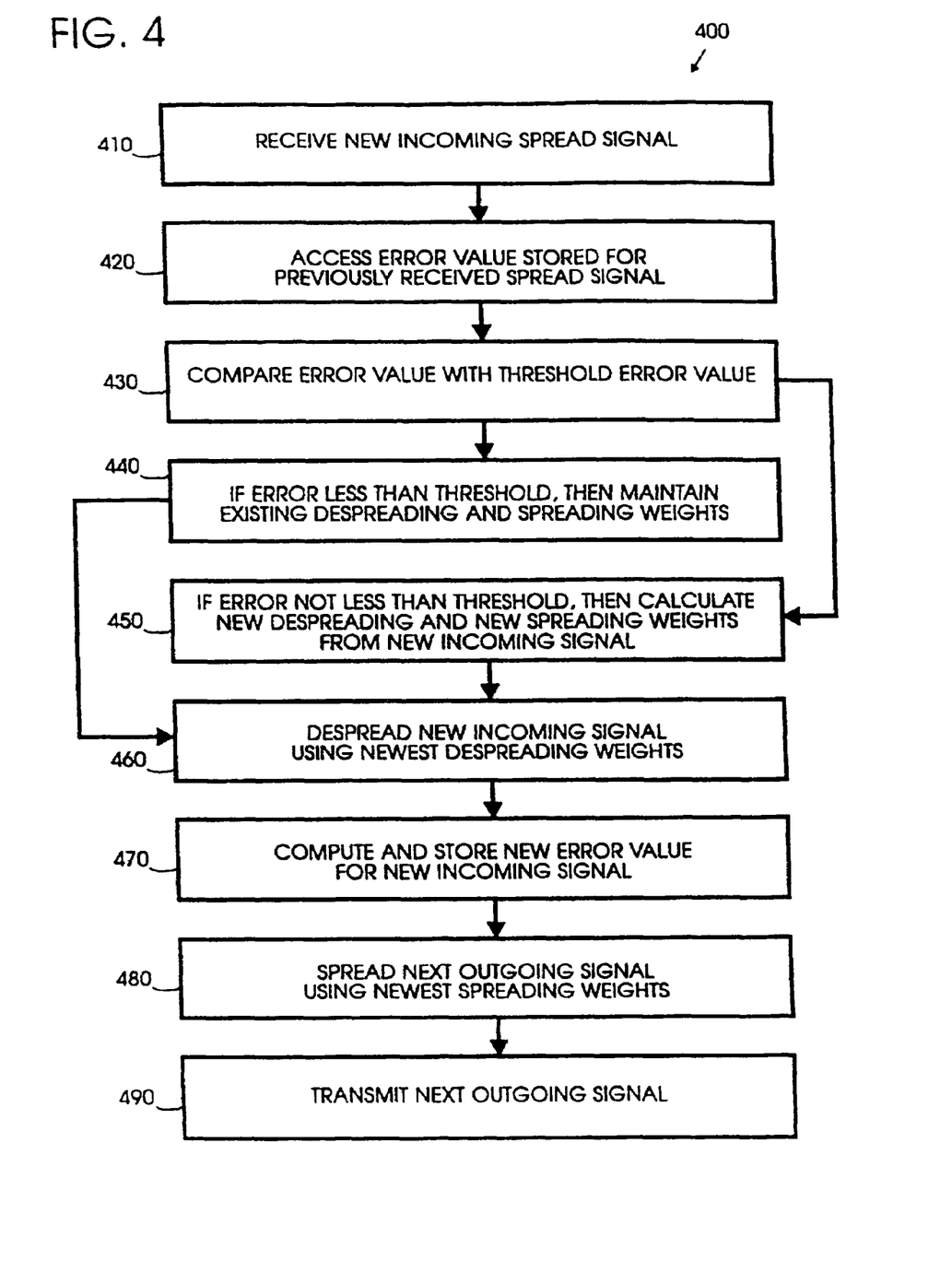
FIG. 4 is a flow diagram of a preferred embodiment of the invention where the despreading weights at the base station are updated only when the error in a previously received signal is greater than a threshold value. The new incoming signal is despread with the newest despreading weights after the comparison of the error value for the previous incoming signal and the selective updating of the weights based on the new incoming signal.

FIG. 4 is a flow diagram 400 of a preferred embodiment of the invention where the despreading weights at the base station are updated only when the error in a previously received signal is greater than a threshold value. The new incoming signal is despread with the newest despreading weights after the comparison of the error value for the previous incoming signal and the selective updating of the weights based on the new incoming signal.

In accordance with the alternate and preferred embodiment of the invention in FIG. 4, the method includes the step 410 of receiving at a base station a new incoming spread signal comprising an incoming data signal spread over a plurality of discrete frequencies.

The method continues in step 420 by accessing a stored error value for a previously received spread signal.

In step 430, the error value is then compared with a threshold error value. Then, in accordance with the invention, the spreading weights and despreading weights for the base station are adaptively updated, depending on the error value.

In step 440, if the error value is less than the threshold error value, then the method maintains the existing despreading and spreading weights as the current spreading weights at the base station to apply to the new incoming signal in step 460 and the next outgoing data signal in step 480.

Alternately, in step 450, if the error value is greater than the threshold error value, then the method adaptively calculates new despreading weights at the base station from the new incoming spread signal and calculates new spreading weights from the new despreading weights to apply to the new incoming signal in step 460 and the next outgoing data signal in step 480.

The new incoming signal is then despread using the newest despreading weights in step 460. Then, in step 470, the method computes and stores a new error value for the new incoming signal. Later, in step 480, the next outgoing data signal is spread using the newest spreading weights. The outgoing signal is spread to distribute the outgoing data signal over a plurality of discrete tones and is transmitted by the base station in step 490. In this manner, the computationally intensive calculation of new spreading and despreading weights is performed only when needed to maintain the desired signal quality.

Figure 5:
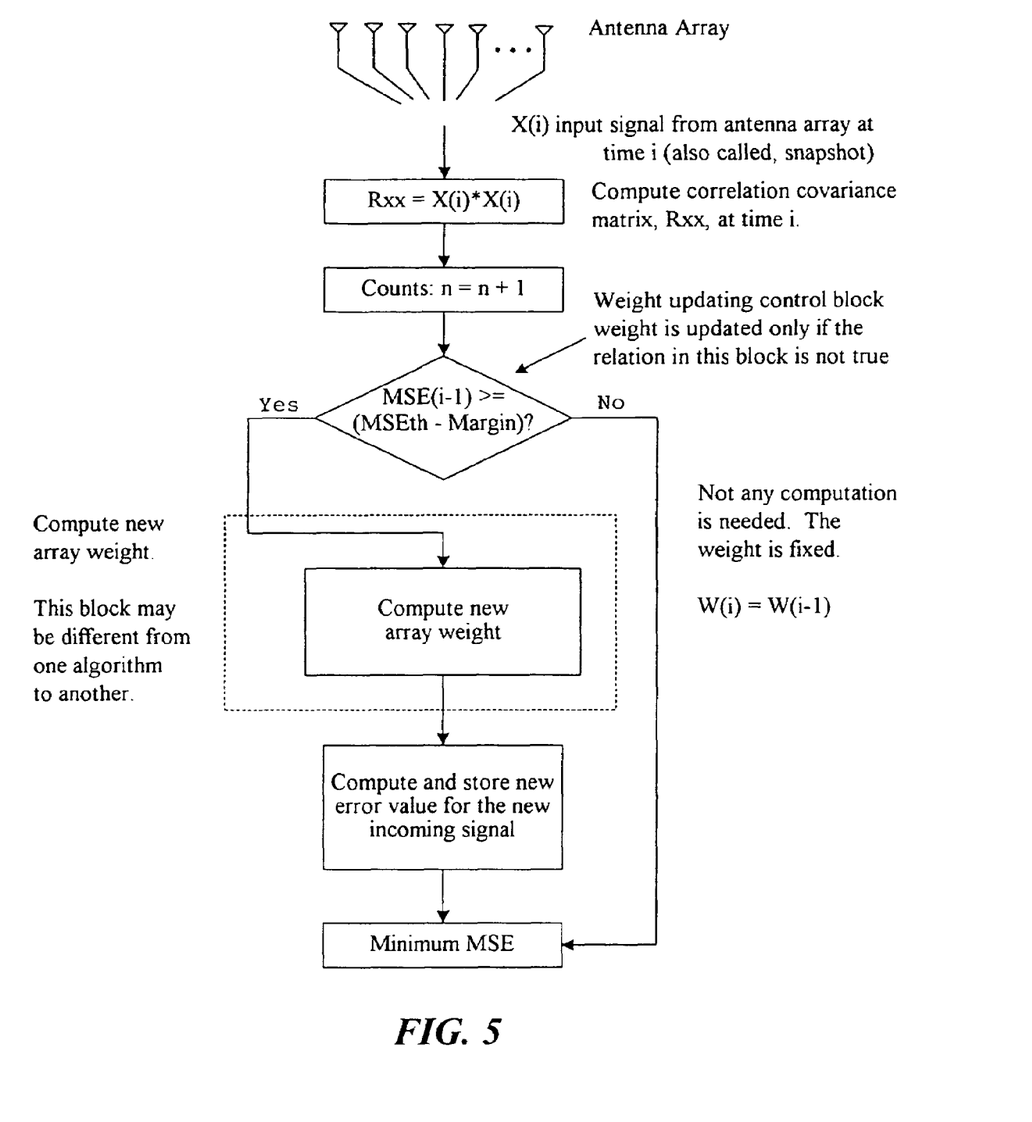
FIG. 5 is a more detailed flow diagram of the preferred embodiment of the invention.

FIG. 5 is a more detailed flow diagram of the preferred embodiment of the invention. It describes a high efficiency array antenna steering weight update method. In this scheme, the array steering weight vector will be updated only when a link's minimum mean square error (MSE) >=MSEth-Margin, where MSEth is the link's limit MSE which is 14.5 dB and corresponds to the bit error rate (BER)=10e-6 for 16 QAM modulation. The Margin is the system alarm range and can be very small such as 1 dB. This scheme has the advantage of fixed beam antenna array's simplicity when the channel is static, while the system's performance can be the same as that of a fully adaptive array system when the channel is time varying. The array weight vector will be updated only when it is demanded by the system. Therefore, the proposed scheme is an on-demand array weight update method.

In a first example, if the channel's variation is small enough to not cause a link performance problem, the MSE will be small and will not rise to the alarm level of MSEth-Margin. Thus, in this example, the spreading weights will remain fixed and no computation will be required. The base station will not be required to compute new spreading weights for an incoming signal. This avoids unnecessary computations for matrix inversion and matrix multiplication. Typically, a channel may remain static, especially for the case of a wireless local loop in which both the base station and the remote station unit are fixed.

In a second example, if the channel changes rapidly and the corresponding MSE reaches the alarm level of MSEth-Margin, the method of FIG. 5 will automatically adjust the spreading weight update rate so that the link performance is kept within the accepted range.

In FIG. 5, the correlation covariance matrix Rxx is computed from the input signal vector X(i) at the base station. The stored value of the mean square error MSE(i−1) for a previously received spread signal, is accessed and compared with the limit value MSEth minus the Margin value. If the value of MSE(i−1) is less than the limit value MSEth minus the Margin value, then the existing values for the despreading weights W(n) and the spreading weights are maintained.

If the MSE(i−1) is equal to or greater than the limit value MSEth minus the Margin value, then new values must be computed for the despreading weights W(n) and the spreading weights. The details of this computation are given in the referenced Alamouti, et al. patent application.

In FIG. 5, if the error value is less than the threshold error value, then the method maintains the existing despreading and spreading weights as the current spreading weights at the base station to apply to the new incoming signal and the next outgoing data signal. Alternately, if the error value is greater than the threshold error value, then the method adaptively calculates new despreading weights at the base station from the new incoming spread signal and calculates new spreading weights from the new despreading weights to apply to the new incoming signal and the next outgoing data signal. The new incoming signal is then despread using the newest despreading weights.

Then, the method computes and stores a new error value for the new incoming signal. Later, the next outgoing data signal is spread using the newest spreading weights. The outgoing signal is spread to distribute the outgoing data signal over a plurality of discrete tones and is transmitted by the base station. The resultant spreading weight updating method avoids a significant computation load while the link performance is maintained even if channel's variation is large.

Figure 6:
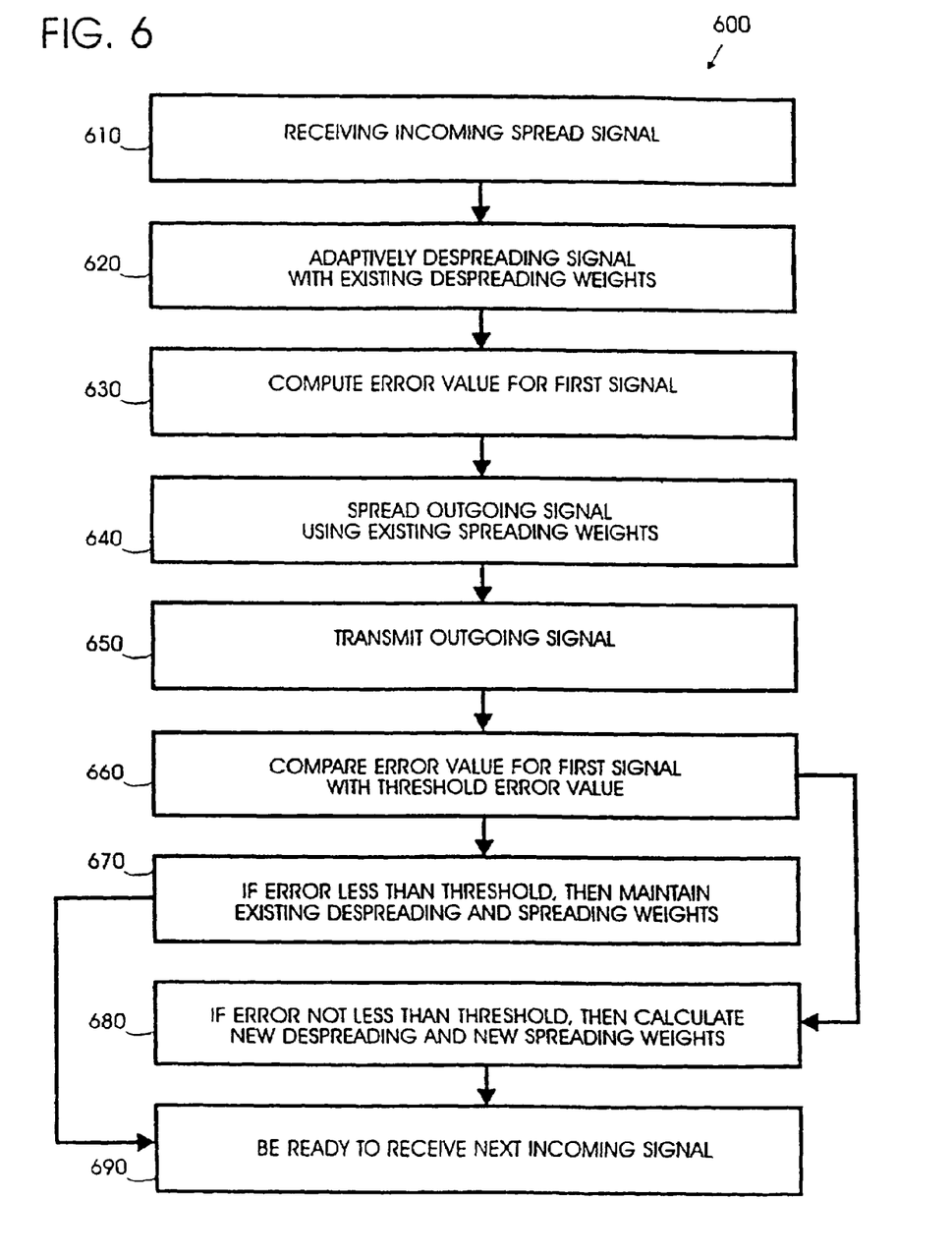
FIG. 6 is a flow diagram of another alternate embodiment of the invention showing a flow diagram of the sequence of operational steps.

FIG. 6 begins flow diagram 600 at step 610 which receives the incoming spread signal. Step 620 adaptively despreads the signal with the existing despreading weights. Step 630 computes the error value for the first signal. Step 640 spreads the outgoing signal using the existing spreading weights. Step 650 transmits the outgoing signal. Step 660 compares the error value for first signal with a threshold error value. Step 670 determines that if the error is less that the threshold, then it maintains the existing despreading and spreading weights. Step 680 determines is the error is not less than the threshold, then it calculates the new despreading and new spreading weights. Step 690 has the base station ready to receive the next incoming signal. In this manner, unnecessary computations are avoided.

In an alternate embodiment of the invention, the base station receives a pilot signal over a channel and measures its distortion by the channel as a first channel response characteristic. Then, it adaptively calculates a despread matrix of first despreading weights that maximizes the ratio of signal-to-noise-and-interference associated with the received pilot signal. Then it receives a first spread signal comprising an incoming data signal spread over a plurality of discrete frequencies. Then it adaptively despreads the signal received at the base station by using the first despreading weights. The it computes an error value for the first spread signal. Then it compares the error value with a threshold error value. The base station maintains the first despreading weights as current despreading weights in response to the error value being less than the threshold error value. Alternately, the base station adaptively calculates second despreading weights from the first spread in response to the error value being greater than the threshold error value. Then later the base station receives a second spread signal comprising an incoming data signal spread over a plurality of discrete frequencies It then adaptively despreads the second signal received by using the second despreading weights. In this manner, unnecessary computations are avoided.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A highly bandwidth-efficient communications method, comprising:
    receiving at a base station a new incoming modulated signal;
    accessing a stored error value calculated from a previously received modulated signal;
    comparing the stored error value with a threshold error value;
    if the stored error value is less than the threshold error value, then maintaining existing modulation and demodulation parameters at the base station as current modulation and demodulation parameters;
    if the stored error value is greater than the threshold error value, then calculating new demodulation and corresponding modulation parameters at the base station to apply to new incoming signals and outgoing signals, respectively;
    demodulating the new incoming signal;
    computing and storing a new error value for the new incoming signal; and modulating a next outgoing signal.

2. highly bandwidth-efficient communications method of claim 1, wherein the incoming modulated signal is a spread signal that is spread over a plurality of discrete frequencies.

3. The highly bandwidth-efficient communications method of claim 1, wherein the stored error value for the previously received modulated signal is a bit error rate.

4. The highly bandwidth-efficient communications method of claim 1, wherein the stored error value for the previously received modulated signal is a Reed-Solomon error value.

5. The highly bandwidth-efficient communications method of claim 1, wherein the stored error value for the previously received modulated signal is a difference value between the previously received modulated signal and a reference signal.

6. The highly bandwidth-efficient communications method of claim 1, wherein the stored error value for the previously received modulated signal is a mean square error value.

7. The highly bandwidth-efficient communications method of claim 1, wherein the threshold error value is a limit error value less a margin error value.

8. A highly bandwidth-efficient communications method, comprising:
receiving an incoming modulated signal;
assessing a signal degradation of the incoming modulated signal;
if the signal degradation is within acceptable predetermined limits, then maintaining existing modulation and demodulation parameters for subsequent modulation and demodulation processes;
if the signal degradation is greater than the acceptable predetermined limits, then calculating new demodulation and corresponding modulation parameters, using a new incoming signal for subsequent demodulation and modulation processes;
demodulating the new incoming signal; and
modulating a next outgoing signal.

9. The highly bandwidth-efficient communications method of claim 8, wherein the incoming modulated signal is a spread spectrum signal.

10. The highly bandwidth-efficient communications method of claim 8, wherein degradation assessment comprises an error value calculation, wherein the error value calculated is a bit error rate, a Reed-Solomon error value, a difference value between the previously received signal and a reference signal, or a mean square error value.

11. A highly bandwidth-efficient transceiver, comprising:
a receiver for receiving an incoming modulated signal;
a processor for assessing a signal degradation of the incoming modulated signal the processor being further configured to update demodulation and corresponding modulation parameters based on the signal degradation, wherein:
if the signal degradation is within an acceptable predetermined limit, then the processor maintains existing modulation and demodulation parameters;
if the signal degradation is greater than the acceptable predetermined limit limits, then the processor calculates new demodulation and corresponding modulation parameters using a new incoming signal;
wherein the processor demodulates the new incoming signal; and
wherein the processor modulates a new outgoing signal; and
a transmitter for transmitting the modulated outgoing signal.

12. The highly bandwidth-efficient transceiver of claim 11, wherein the incoming modulated signal is a spread spectrum signal.

13. The highly bandwidth-efficient transceiver of claim 11, wherein degradation assessment comprises an error value calculation, wherein the error value calculated is a bit error rate, a Reed-Solomon error value, a difference value between the previously received signal and a reference signal, or a mean square error value.

* * * * *